United States Patent
Hsiao et al.

(10) Patent No.: US 8,018,679 B2
(45) Date of Patent: Sep. 13, 2011

(54) PERPENDICULAR MAGNETIC RECORDING WRITE HEAD WITH SLANTED MAGNETIC WRITE POLE

(75) Inventors: Wen-Chien David Hsiao, San Jose, CA (US); Vladimir Nikitin, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 938 days.

(21) Appl. No.: 11/958,294

(22) Filed: Dec. 17, 2007

(65) Prior Publication Data

US 2009/0154019 A1 Jun. 18, 2009

(51) Int. Cl.
*G11B 5/23* (2006.01)

(52) U.S. Cl. .............. 360/125.07; 360/119.04

(58) Field of Classification Search ............ 360/119.04, 360/125.07, 119.01, 119.02, 125.01, 125.02, 360/125.03, 125.06, 125.15, 125.42, 125.44, 360/125.43, 125.55, 125.57, 125.56, 125.11
See application file for complete search history.

(56) References Cited

U.S. PATENT DOCUMENTS

| | | | |
|---|---|---|---|
| 4,742,413 A | 5/1988 | Schewe | |
| 5,167,062 A * | 12/1992 | Castera et al. ............ | 29/603.14 |
| 5,267,112 A * | 11/1993 | Batra et al. ............... | 360/125.42 |
| 5,479,310 A | 12/1995 | Atsushi et al. | |
| 5,978,187 A | 11/1999 | Shouji et al. | |
| 6,010,753 A | 1/2000 | Shouji et al. | |
| 6,034,848 A | 3/2000 | Garfunkel et al. | |
| 6,477,765 B1 | 11/2002 | Herrera | |
| 6,501,619 B1 * | 12/2002 | Sherrer et al. ............ | 360/125.03 |
| 6,594,112 B1 | 7/2003 | Crue et al. | |
| 6,700,739 B2 | 3/2004 | Kim et al. | |
| 6,710,973 B2 | 3/2004 | Okada et al. | |
| 7,417,824 B2 * | 8/2008 | Kameda .................... | 360/125.02 |
| 2004/0201920 A1 * | 10/2004 | Koide et al. .................... | 360/128 |
| 2005/0044699 A1 * | 3/2005 | Khera et al. ................ | 29/603.12 |
| 2005/0219747 A1 * | 10/2005 | Hsu et al. ........................ | 360/126 |
| 2006/0092565 A1 | 5/2006 | Ho et al. | |
| 2006/0098340 A1 * | 5/2006 | Kameda ......................... | 360/126 |
| 2006/0203384 A1 * | 9/2006 | Maruyama et al. ........... | 360/126 |
| 2007/0139818 A1 * | 6/2007 | Shimazawa et al. ........... | 360/126 |
| 2009/0116145 A1 * | 5/2009 | Guan et al. ............... | 360/125.02 |
| 2009/0279207 A1 * | 11/2009 | Sasaki et al. ............. | 360/125.03 |

OTHER PUBLICATIONS

Liu et al. "Distribution of Slanted Write Field for Perpendicular Recording Heads with Shielded Pole", IEEE Transactions on Magnetics, vol. 41, No. 10, Oct. 2005, pp. 2908-2910.

* cited by examiner

*Primary Examiner* — Julie Anne Watko
(74) *Attorney, Agent, or Firm* — Thomas R. Berthold (57) ABSTRACT

A perpendicular magnetic recording write head is formed on the trailing surface of a head carrier or slider that has an air-bearing surface (ABS) oriented generally parallel to the surface of the disk during operation of the disk drive. The write head has a slanted ferromagnetic write pole (WP) that forms an angle between about 5 and 20 degrees from a normal to the ABS. The slanted WP is formed over the generally planar surface of the ferromagnetic main pole and the slanted surface of a support layer located between the ABS and the recessed end of the main pole. A trailing shield (TS) has a slanted face that is generally parallel to and spaced from the slanted WP, with a nonmagnetic gap layer located between the slanted face of the TS and the slanted WP.

14 Claims, 12 Drawing Sheets

PERPENDICULAR MAGNETIC RECORDING WRITE HEAD WITH SLANTED MAGNETIC WRITE POLE

BACKGROUND OF THE INVENTION

1. Field of the Invention

This invention relates generally to perpendicular magnetic recording write heads for use in magnetic recording disk drives.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. The recording or write head in perpendicular magnetic recording disk drives includes a write pole for directing a magnetic field to data tracks in the recording layer, and one or more return poles for return of magnetic flux from the recording layer.

The write head may also include a trailing shield (TS) of magnetically permeable material that faces the recording layer and is spaced from the write pole in the along-the-track direction by a nonmagnetic gap. The TS slightly alters the angle of the write field and makes writing more efficient.

The write head may also include a pair of side shields located on opposite sides of the write pole in the cross-track direction and separated from the write pole by a nonmagnetic gap layer. The side shields control the write width and help reduce adjacent-track-erasure. Typically the TS and side shields are connected or formed as a single-piece structure to form a wraparound shield (WAS) that generally surrounds the write pole. A perpendicular magnetic recording write head with a WAS is described in U.S. Pat. No. 7,002,775 B2, assigned to the same assignee as this application.

Perpendicular magnetic recording at high a real density is limited by the strength of the write field and the write field gradient at the point of writing. Additionally, a high write field increases the likelihood of erasure of adjacent tracks, especially when the write head is located at a high skew angle relative to the data track to be written.

What is needed is a perpendicular magnetic recording write head that generates a high write field and high write field gradient without increasing the likelihood of adjacent-track-erasure.

SUMMARY OF THE INVENTION

The invention is a perpendicular magnetic recording write head that may be used in magnetic recording disk drives. In a disk drive implementation the write head is formed on the trailing surface of a head carrier or slider that has an air-bearing surface (ABS) oriented generally perpendicular to its trailing surface and generally parallel to the surface of the disk during operation of the disk drive. The write head has a slanted ferromagnetic write pole (WP) that forms an angle between about 5 and 20 degrees from a normal to the ABS. The slanted WP is formed over the generally planar surface of the ferromagnetic main pole and the slanted surface of a support layer located between the ABS and the recessed end of the main pole. A trailing shield (TS) has a slanted face that is generally parallel to and spaced from the slanted WP, with a nonmagnetic gap layer located between the slanted face of the TS and the slanted WP.

The write head with the slanted WP results in a larger write field. The peak field, which occurs approximately at the edge of the end of the slanted WP adjacent the gap layer between the WP and the TS, is increased, which enables the gap layer to be made thinner. A thinner gap layer results in a better write field gradient. The write head with slanted WP also results in a smaller magnetic core width (MCW), which is the written width on the medium, which reduces the likelihood of erasure on adjacent tracks, especially when writing at a large skew angle relative to a data track.

The write head with slanted WP may also include a pair of side shields located on opposite sides of the WP in the cross-track direction and separated from the WP by a nonmagnetic gap layer. The side shields control the write width and help reduce adjacent-track-erasure. The write head with slanted WP may also include a leading shield (LS) located on the opposite side of the WP from the TS in the along-the-track direction and separated from the WP by a nonmagnetic gap layer. The LS reduces the fringing field at the leading edge of the WP and helps control erasure width at the skew angle.

For a fuller understanding of the nature and advantages of the present invention, reference should be made to the following detailed description taken together with the accompanying figures.

DETAILED DESCRIPTION OF THE INVENTION

Figure 1A:
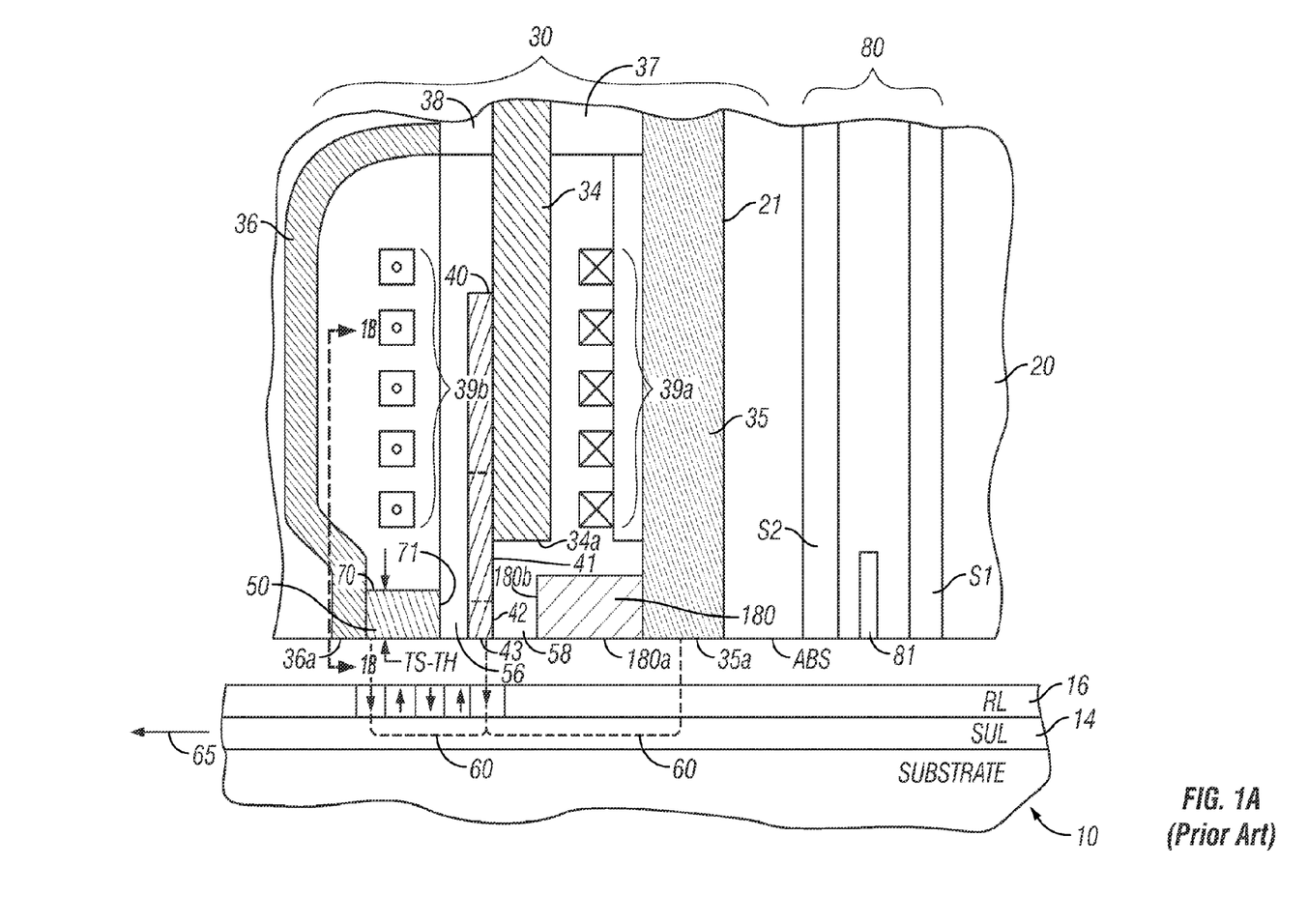
FIG. 1A is a side sectional view of a prior art perpendicular magnetic recording system showing a read head, a write head, and a recording medium through a central plane that intersects a data track on the medium.

FIG. 1A is a side sectional view of a prior art perpendicular magnetic recording write head, read head and a recording medium taken through a central plane that intersects a data track on the medium. As shown in FIG. 1A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a single write pole type of recording or write head 30. The recording head is typically formed on a trailing surface 21 of an air-bearing slider 20 that has its air-bearing surface (ABS) supported above the surface of medium 10. The recording head 30 includes a yoke made up of the main pole 34, first or leading flux return pole 35, second or trailing flux return pole 36 and yoke studs 37, 38 connecting the main pole and return poles 35, 36 respectively; and a thin film coil 39a, 39b shown in section around main pole 34. The main pole 34 has an end 34a that is recessed from the ABS. A flared write pole (WP) 40 is connected to the main pole 34 and has a flared portion 41 and a pole tip 42 with an end 43 that faces the outer surface of medium 10. Write current through coil 39a, 39b induces a magnetic field (shown by dashed line 60) from the WP 40 that passes through the RL 16 (to magnetize the region of the RL 16 beneath the WP 40), through the flux return path provided by the SUL 14, and back to the ends 35a, 36a of return poles 35, 36, respectively.

A magnetoresistive (MR) read head 80 comprised of a MR sensing element 81 located between MR shields S1 and S2 is also deposited on the trailing end of the slider 20 prior to the deposition of the layers making up the write head 30. As depicted in FIG. 1A, trailing surface 21 may be a nonmagnetic layer deposited on the MR shield S2. In FIG. 1A, the medium 10 moves past the recording head 30 in the direction indicated by arrow 65, so the portion of slider 20 that supports the MR head 80 and write head 30 is often called the slider "trailing" end, and the surface perpendicular to the slider ABS on which the write head 30 is located is often called the "trailing" surface.

The RL 16 is illustrated with perpendicularly recorded or magnetized regions, with adjacent regions having opposite magnetization directions, as represented by the arrows. The magnetic transitions between adjacent oppositely-directed magnetized regions are detectable by the MR sensing element 81 as the recorded bits.

FIG. 1A also illustrates a trailing shield (TS) 50 separated from WP 40 by a nonmagnetic gap layer 56. The TS 50 has a throat height (TS-TH), defined generally as the distance between the ABS and a back edge 70. The TS 50 has a face 71 that is generally parallel to and spaced from WP tip 42 by a nonmagnetic gap 56. Both the face 71 and the WP flared portion 41 and WP tip 42 have surfaces generally normal to the ABS. The TS 50 is magnetically permeable material formed of soft (low coercivity) ferromagnetic material. The TS 50, which is separated from the WP 40 by nonmagnetic gap 56, slightly alters the angle of the write field and makes writing more efficient.

FIG. 1A also illustrates an optional leading shield (LS) 180 separated from WP 40 by a nonmagnetic gap layer 58. The LS 180 has an end 180a at the ABS and a face 180b that is generally parallel to and spaced from WP 42 by the nonmagnetic gap 58. The LS 180 is shown as being connected to leading flux return pole 35. The LS 180 reduces the fringing field at the leading edge of the WP end 43 and controls erasure width at the skew angle.

Figure 1B:
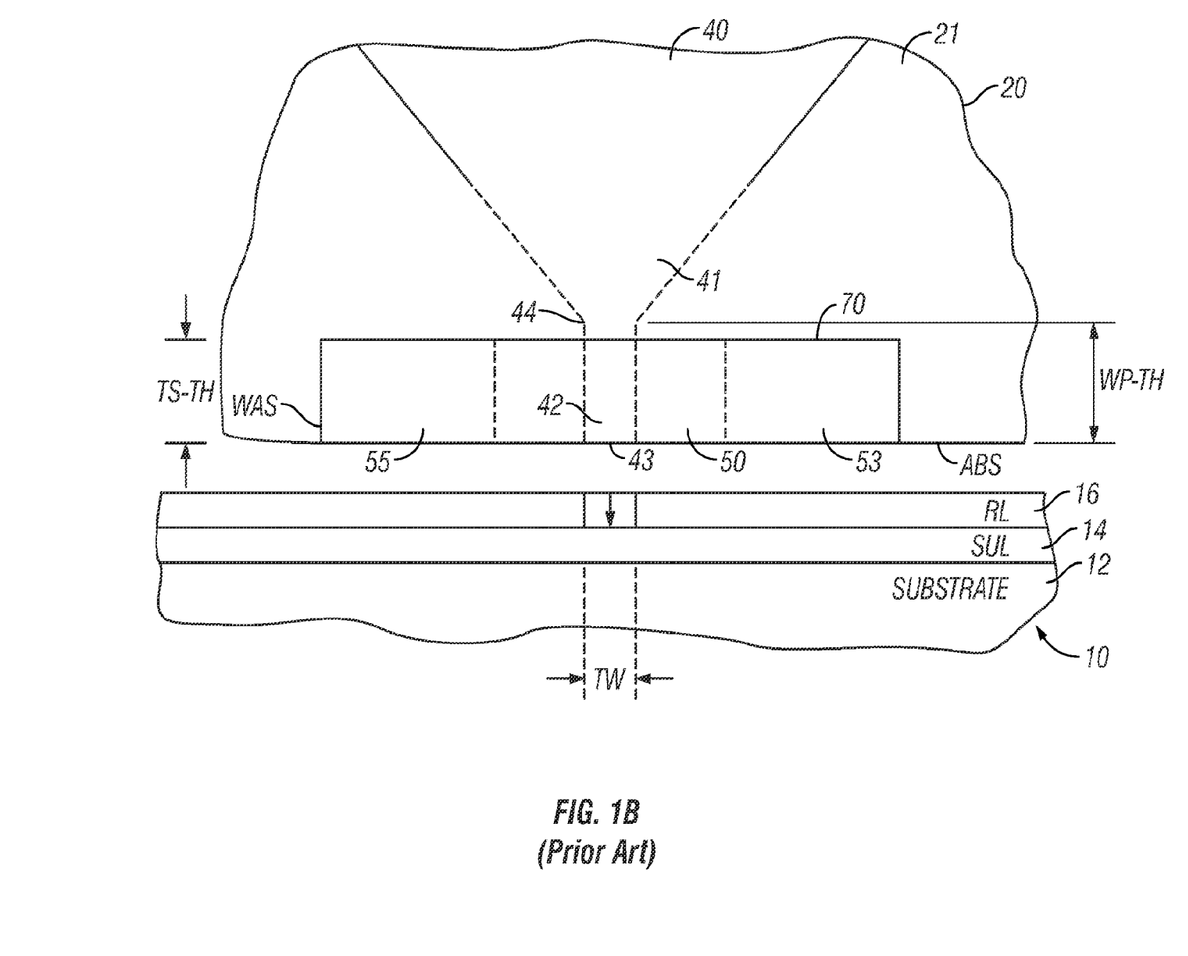
FIG. 1B is a view in the direction 1B-1B of FIG. 1A and shows the write pole (WP) and the wraparound shield (WAS) that includes the trailing shield (TS) and side shields (SS) in the prior art write head of FIG. 1A.

FIG. 1B is a view in the direction 1B-1B of FIG. 1A to illustrate the WP 40 and the TS 50 on trailing surface 21 of slider 20. To simplify the illustration of FIG. 1B, neither the gap layer 56 nor the layers between WP 40 and the surface 21, shown in FIG. 1A, are shown in FIG. 1B. The region between the WP tip 42 and the flare portion 41 is called the flare point 44. The flare point 44 of the WP 40 is sometimes referred to as the "choke" point because it is the point where the flux density is highest and where the WP 40 saturates. The WP tip 42 has a throat height (TH) which is generally the distance from end 43 to flare point 44. As shown in FIG. 1B, the two side walls of WP tip 42 define its width in the cross-track direction, which substantially defines the trackwidth (TW) of the data recorded in the RL 16. The region of the WP 40 above the flare region 41 is substantially wider than WP tip 42 below the flare region 41 and the flare point 44 is recessed from the ABS and is the transition point where the WP 40 begins to widen with distance from the ABS. The flare angle between flare region 41 and WP 42 is between 90 and 180 degrees, typically between about 120 and 150 degrees.

FIG. 1B also illustrates the TS 50. The portions identified as 53, 55 on opposite ends of TS 50 are side shields which, together with TS 50, form a wraparound shield (WAS) that generally surrounds the WP tip 42. The TH for the TS 50 is the distance from the ABS to the back edge 70. This is also the throat height (SS-TH) for the side shields 53, 55.

Figure 1C:
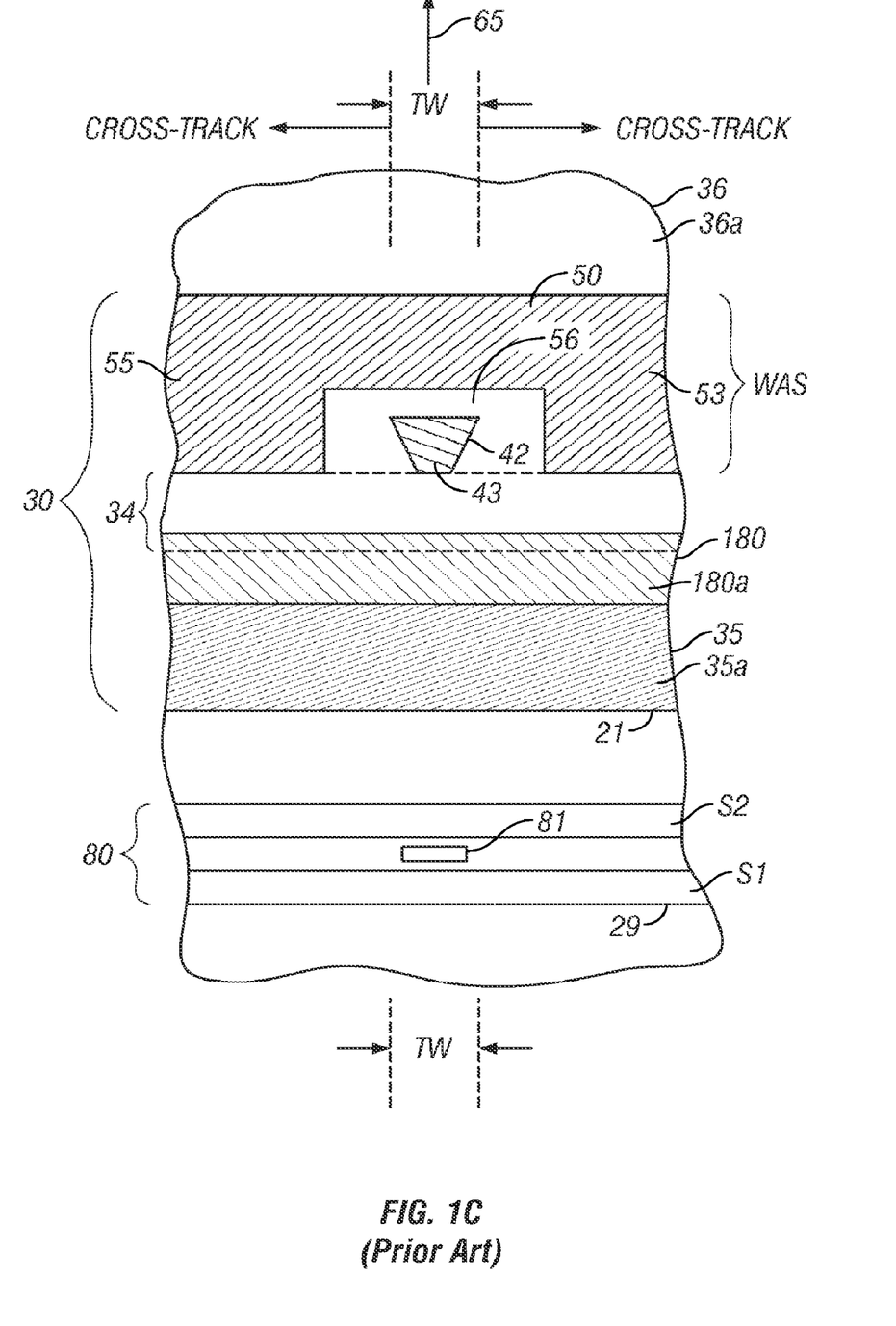
FIG. 1C is a view from the air-bearing surface (ABS) of the prior art write head and read head in FIG. 1A and shows the WAS.

FIG. 1C illustrates the write head 30 as seen from the recording medium 10. The ABS is the recording-layer-facing surface of the slider that faces the medium 10 and is shown in FIG. 1C without the thin protective overcoat typically present in an actual slider. The recording-layer-facing surface shall mean the surface of the slider 20 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The recording medium 10 moves relative to the head 30 in the direction 65, which is called the along-the-track direction. The direction perpendicular to direction 65 and parallel to the plane of the ABS is called the cross-track direction. The width of the end 43 of WP tip 42 in the cross-track direction substantially defines the track-width (TW) of the data tracks in the RL 16. The main pole 34 is shown with a dashed line because it's end 34a is recessed from the ABS (see FIG. 1A).

The WAS that includes side shields 53, 55 and TS 50 is described in detail as a shield for a conventional perpendicular recording head in U.S. Pat. No. 7,002,775 B2, assigned to the same assignee as this application. The shields 50, 53, 55 all have ends substantially at the recording-layer-facing surface. The shields 50, 53, 55 are formed as a single-piece structure to form the WAS that substantially surrounds the WP tip 42 and are thus formed of the same material, typically a NiFe, CoFe or NiFeCo alloy, so that they have the same alloy composition. The TS 50 and side shields 53, 55 are separated from WP tip 42 by nonmagnetic gap material, typically alumina, which forms the gap layer 56. The WAS, which is separated from the WP tip 42 by gap layer 56, alters the angle of the write field and improves the write field gradient at the point of writing, and also shields the writing field at regions of the medium 10 away from the track being written. The WAS is shown as connected to the return pole 36. However, the WAS may be a "floating" shield not connected to either the return pole 36 or other portions of the yoke by flux-conducting material. In other variations of the write head 30, only a TS may be used without side shields. The TS may be either "floating" or connected to return pole 36.

FIG. 1C also illustrates the magnetoresistive (MR) read head 80 that includes the MR sensor 81 located between MR shields S1, S2. The films making up MR head 80 and write head 30 as shown in FIG. 1C are formed in succession on the trailing end of air-bearing slider 20, by a series of thin film deposition, etching and lithographic patterning processes. As shown in FIG. 1C, the films making up (MR) read head 80 are formed on substrate surface 29 and the films making up write head 30 are formed on substrate surface 21, which is typically a layer of nonmagnetic material, like alumina, that separates write head 30 from read head 80.

The yoke and shields of write head 30 are formed of soft ferromagnetic material, such as alloys of NiFe, CoFe and NiFeCo that are typically formed by electroplating. Ferromagnetic materials used for the main pole and write pole are typically characterized by the strength of the magnetic field, or magnetic flux density, measured in Tesla (T), that the material is capable of producing. Generally, the higher the magnetic moment of the ferromagnetic material, the higher the magnetic flux density. For example, $Ni_{45}Fe_{55}$ has a magnetic flux density of about 1.6T, $Ni_{20}Fe_{80}$ has a magnetic flux density of about 2.2T and $CO_{32}Fe_{68}$ has a magnetic flux density of about 2.4T. The WP 40 is typically formed of a higher-moment material than the material of the main pole 34. While main pole 34 is typically formed by electroplating, WP 40 is typically formed by sputter deposition, and may be a laminated structure.

Figure 2A:
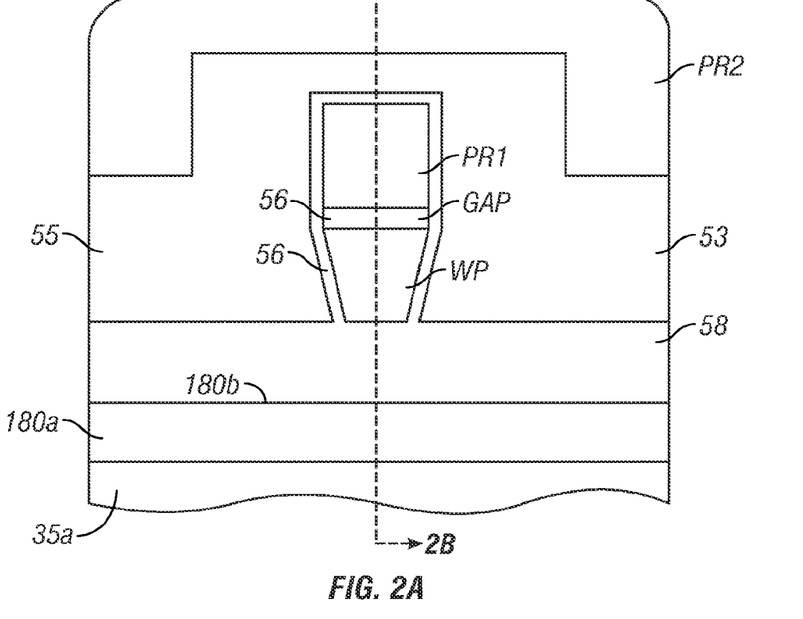
FIGS. 2A and 2B are views of the structure during a processing step in the fabrication of the write head shown in FIGS. 1A-1C, with FIG. 2B being a sectional view of plane B-B in FIG. 2A.
Figure 2B:
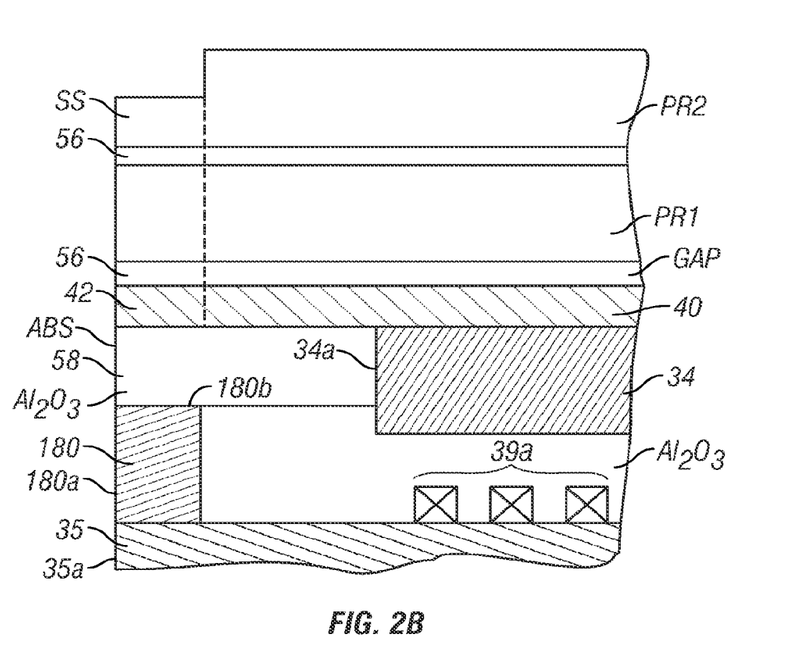

FIGS. 2A-2B illustrate the initial steps in the fabrication of the write head 30. FIG. 2B is a sectional view of plane B-B in FIG. 2A. The first or leading flux return pole 35 is electroplated, then $Al_2O_3$ is refilled, and chemical-mechanical polishing (CMP) is performed. Photolithography and further electroplating of the Cu coil 39a and the magnetically permeable material for LS 180 are performed. Then refilling with $Al_2O_3$ and CMP results in the formation of LS 180 on return pole 35. Photolithography and further electroplating defines main pole 34 and then $Al_2O_3$ refilling and CMP are performed to planarize the alumina and the material of main pole 34, leaving the alumina as gap layer 58.

To achieve the WP structure in FIG. 2A, a WP layer of magnetic material is deposited on main pole 34 and gap layer 58 to a thickness corresponding to the desired thickness of the WP, typically in the range of about 50 to 300 nm. The WP layer is high-moment magnetic material, such as CoFe or NiFe, and is formed by sputtering or electroplating. A full film of alumina as the gap layer 56 is deposited over the WP layer, typically by sputtering, and serves as a "thin alumina mask" (TAM) during subsequent ion milling to shape the WP. Other materials that may serve as the gap layer include tantalum-oxide, silicon-oxide, silicon-nitride or diamond-like carbon. The gap layer 56 is typically formed to a thickness in the range of about 20 nm to 60 nm and will serve as the gap (FIG. 1A) between the WP end 43 and the TS 50. A first layer of organic photoresist (PR1) is then deposited and patterned above the gap layer and underlying WP layer. The PR1 layer may be a photo-sensitive organic material provided it is not sensitive to radiation at the wavelengths used in other lithographic steps for forming the write head, or a photo-insensitive organic material like Durimide® 20-1.2 μm, a polyimide material available from Arch Chemicals, Inc. Reactive ion etching (RIE) and ion milling then remove portions of the layers not protected by the patterned PR1 layer. Next, a thin film of alumina is deposited by atomic layer deposition (ALD) over the structure to a thickness of about 40 to 200 nm to form gap layer 56 surrounding the structure. The ALD process is used because of its good conformal coverage over various topographies. Next an electrically conductive seed layer (not shown), such as Ru, Rh or a Au/Ta bilayer, is deposited over gap layer 56, to a thickness in the range of about 5 to 20 nm. A second photoresist layer PR2 is then patterned on the structure to define the area for subsequent electroplating of the magnetically permeable side shield (SS) material for side shields 53, 55. The side shield material is then electroplated onto the seed layer. The structure in FIG. 2A shows the WP spaced from the side shields 53, 55 by the nonmagnetic gap layer 56. The side shield is defined by electroplating through this second photoresist PR2, as shown in FIG. 2B.

Figure 3A:
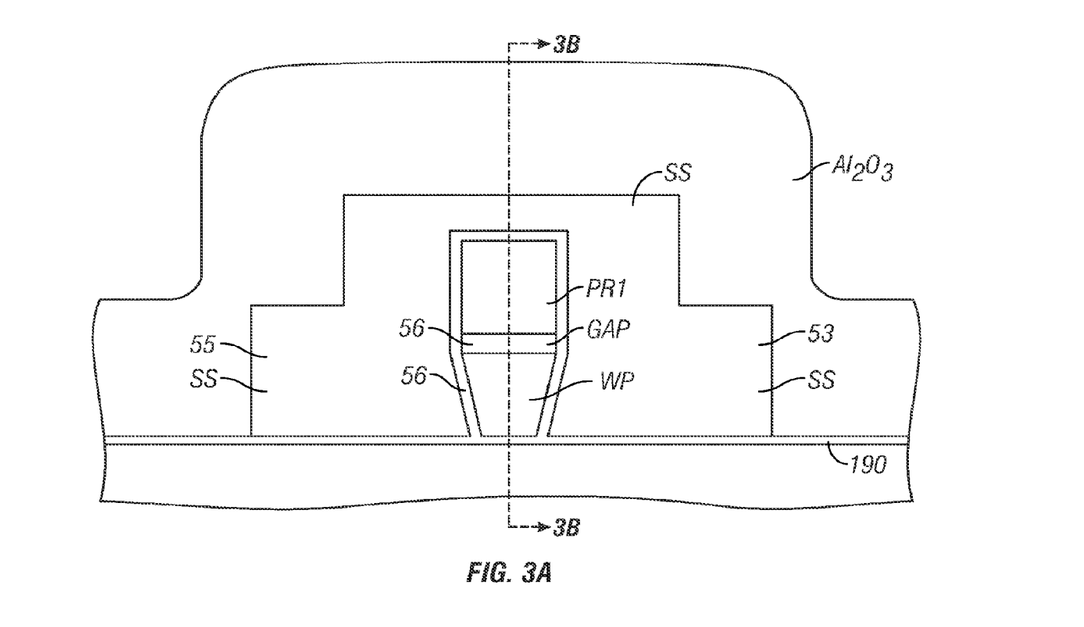
FIGS. 3A and 3B are views of the structure during a processing step in the fabrication of the write head shown in FIGS. 1A-1C, with FIG. 3B being a sectional view of plane B-B in FIG. 3A.
Figure 3B:
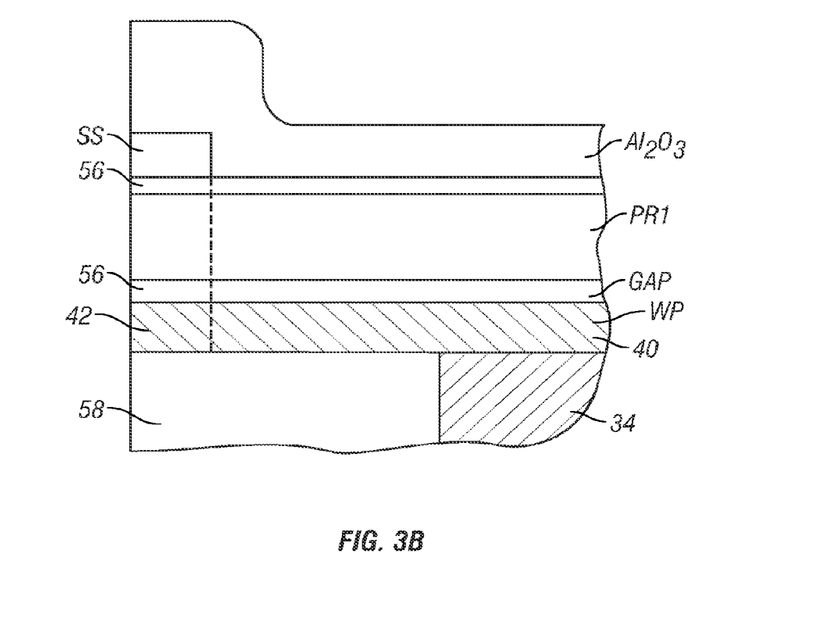
Figure 4A:
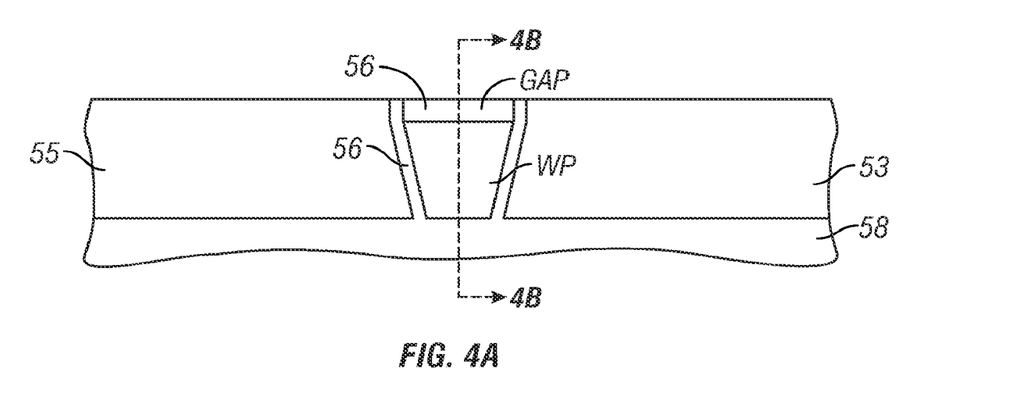
FIGS. 4A and 4B are views of the structure during a processing step in the fabrication of the write head shown in FIGS. 1A-1C, with FIG. 4B being a sectional view of plane B-B in FIG. 4A.
Figure 4B:
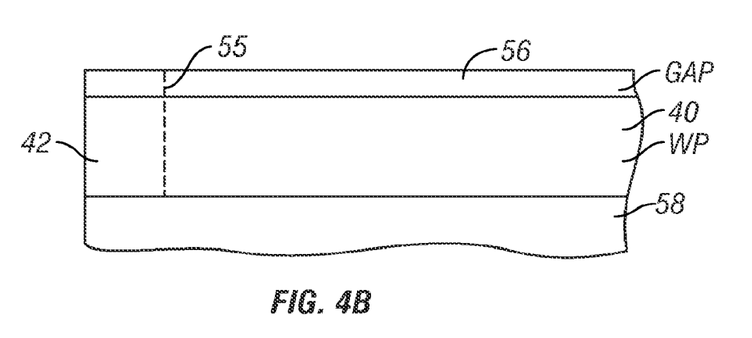

Next in FIG. 3A and FIG. 3B, a sectional view through plane B-B of FIG. 3A, the second photoresist layer PR2 is stripped and $Al_2O_3$ is refilled. Then, in FIG. 4A and FIG. 4B, a sectional view through plane B-B of FIG. 4A, the structure is planarized by CMP. In FIG. 4B, the SS 55 is shown in dashed line because it is behind WP end 42 and gap layer 56.

Figure 5A:
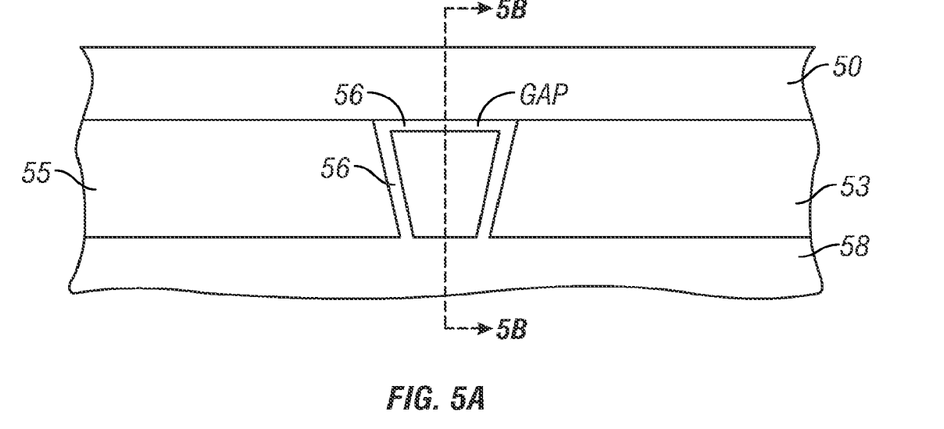
FIGS. 5A and 5B are views of the structure during a processing step for the fabrication of the TS of the write head shown in FIGS. 1A-1C, with FIG. 5B being a sectional view of plane B-B in FIG. 5A.
Figure 5B:
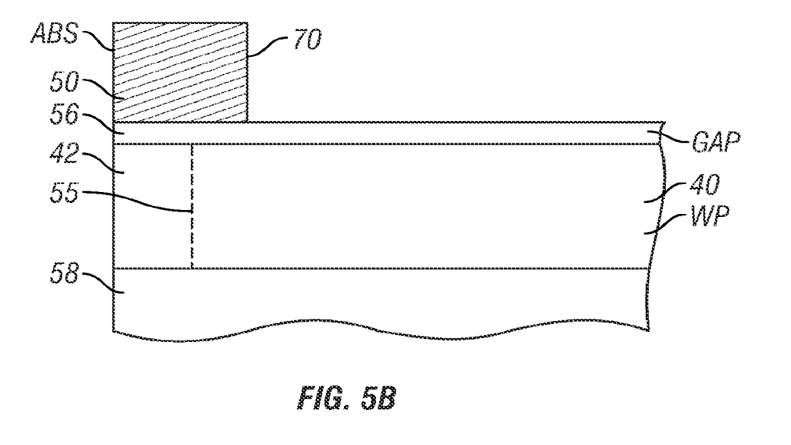

Next, in FIG. 5A and FIG. 5B, a photoresist layer (not shown) is then patterned on the structure to define the area for subsequent electroplating of the magnetically permeable material for the TS 50. A seed layer is deposited and then the TS material is electroplated on the seed layer. The trailing shield throat height, the thickness between the ABS and back edge 70 in FIG. 5B, is defined by electroplating through the photoresist. Then the photoresist layer is stripped, leaving the TS 50, as shown in FIG. 5B. In FIG. 5B, the SS 55 is shown in dashed line because it is behind WP end 42 and gap layer 56.

Figure 6A:
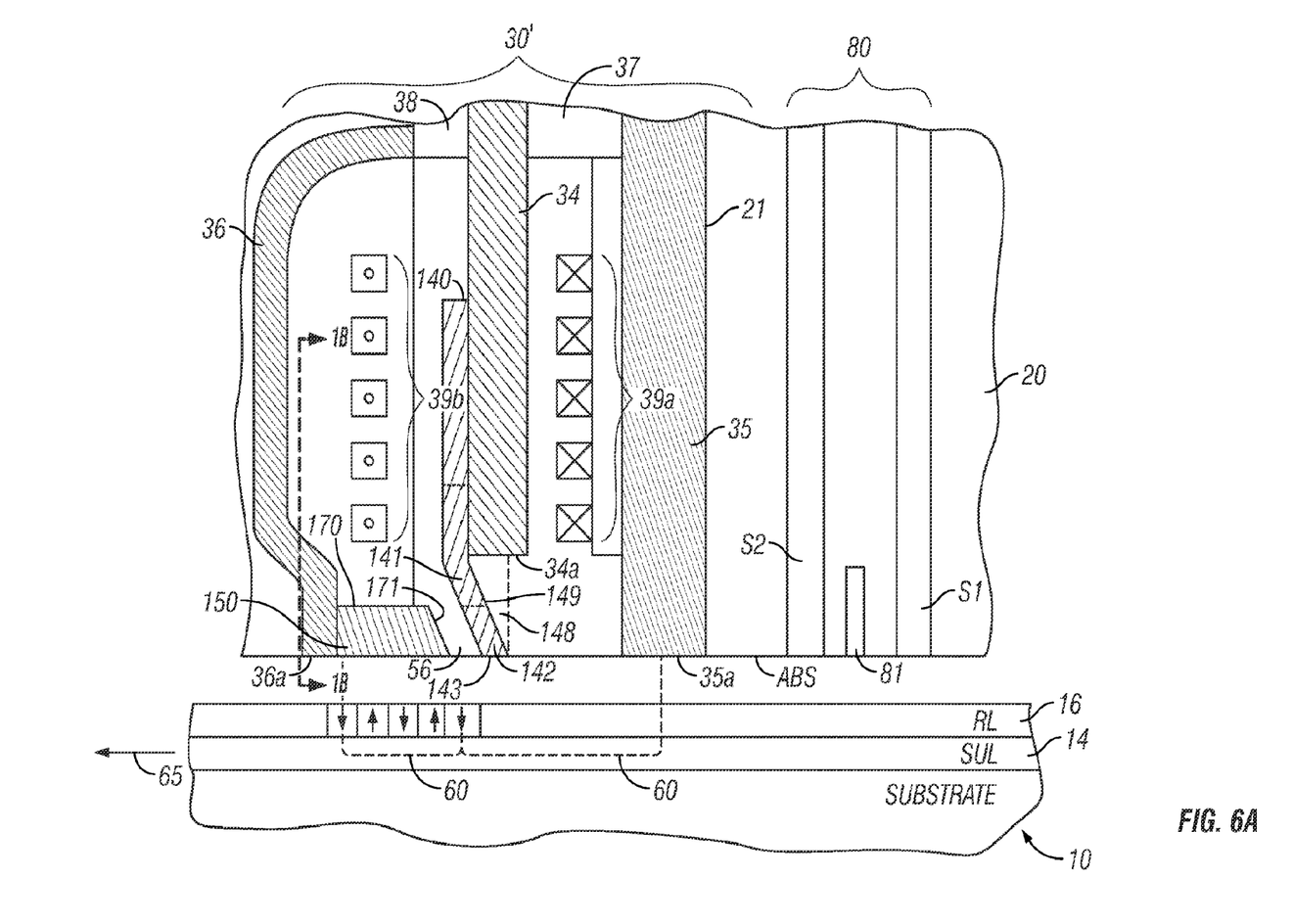
FIG. 6A is a side sectional view of a perpendicular magnetic recording system showing a read head, the write head with slanted WP and TS with slanted face according to this invention, and a recording medium through a central plane that intersects a data track on the medium.
Figure 6B:
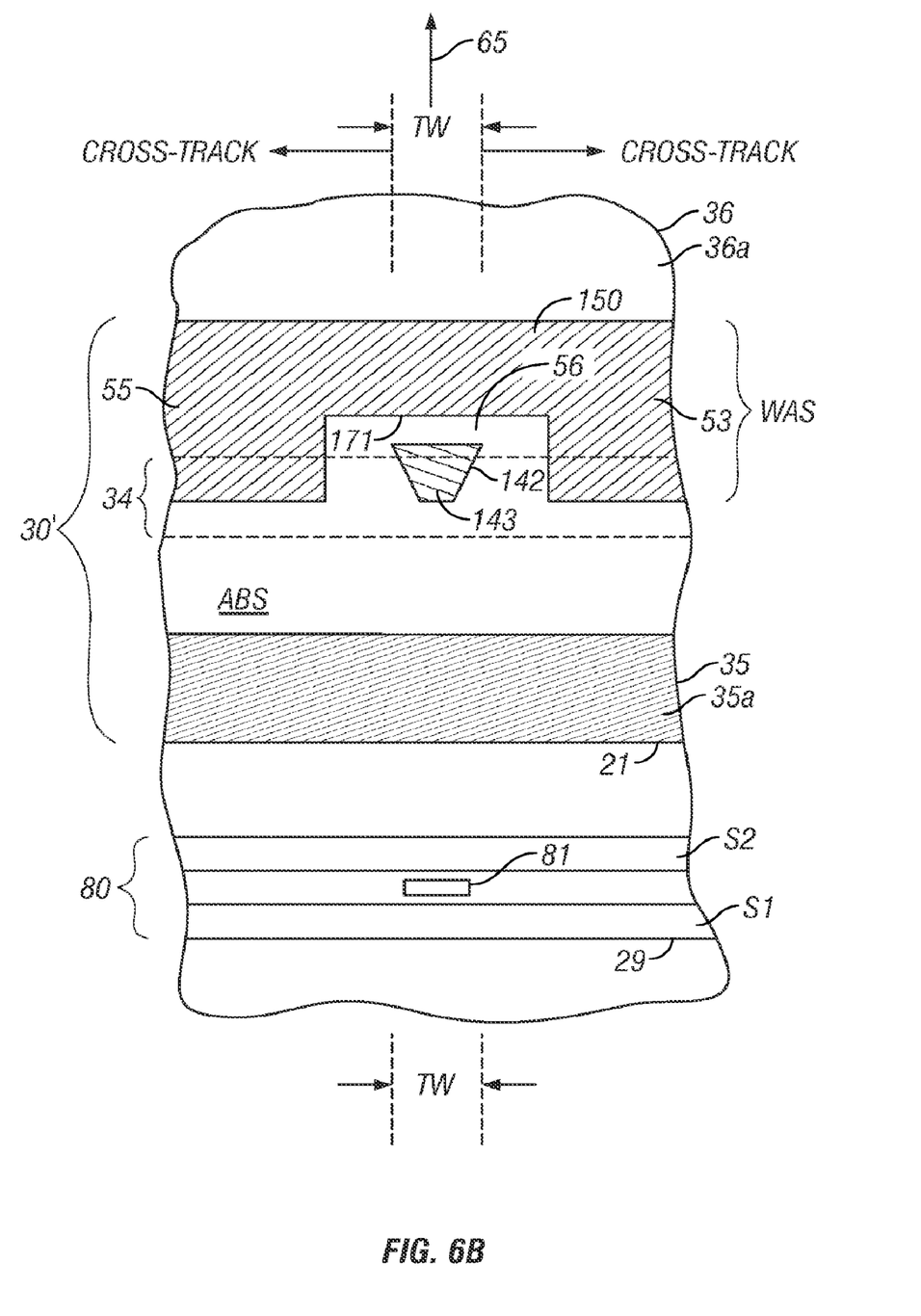
FIG. 6B is a view from the ABS of the write head of this invention.

FIG. 6A is a side sectional view of the perpendicular magnetic recording write head 30' according to this invention, the read head 80 and the recording medium 10 taken through a central plane that intersects a data track on the medium. FIG. 6B is a view from the ABS of the write head of FIG. 6A. The write head 30' has a slanted write pole (WP) 140 formed on the main pole 34. The portion of WP 140 between the ABS recessed end 34a of main pole 34 is slanted between about 5 and 20 degrees from a normal to the ABS. The slanted portion of WP 140 includes the flared region 141 and the WP tip 142 with end 143 at the ABS, and is deposited on slanted surface 149. The slanted surface 149 is the surface of a layer 148. The material of layer 148 may be nonmagnetic, like alumina. Alternatively, layer 148 may be a magnetic material, like the soft magnetic material of main pole 34 or WP 140. In FIG. 6B, the main pole 34 is shown with dashed lines because it is recessed from the ABS.

The trailing shield (TS) 150, which is formed over the WP 140 in the manner as described above and shown in FIGS. 5A-5B, has a slanted face 171 that is generally parallel with and faces the slanted portion of WP 140. The gap layer 56 is located between the slanted portion of WP 140 and slanted face 171 of TS 150.

The write head 30' shown in FIGS. 6A-6B is depicted without an optional leading shield (LS), like LS 180 shown in the prior art write head of FIGS. 1A and 1C. However, the write head 30' of this invention may include a LS, which may be connected to the first or leading flux return pole 35.

Figure 7A:
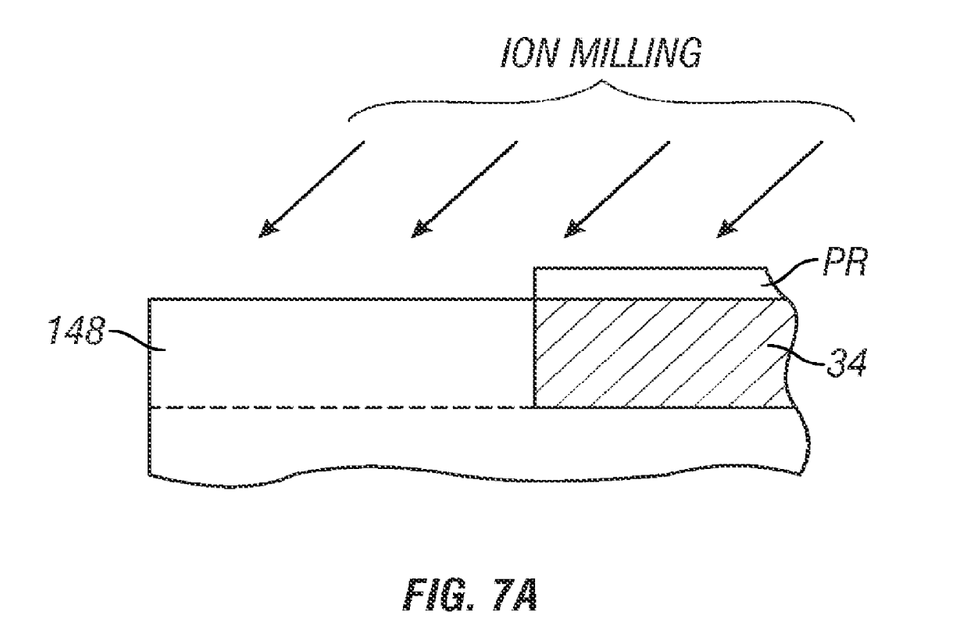
FIGS. 7A and 7B are views of process steps for forming the slanted surface onto which the slanted portion of the WP according to this invention is formed.
Figure 7B:
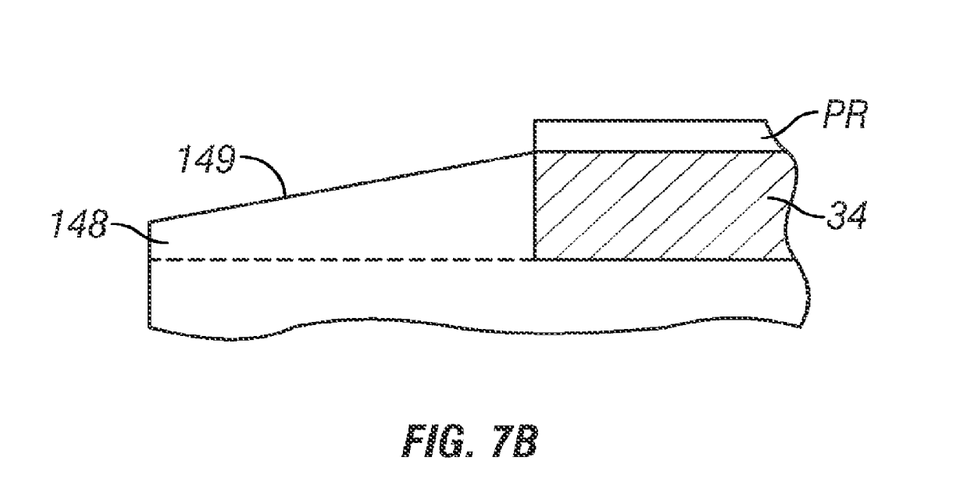

FIGS. 7A and 7B illustrate a process for forming the slanted surface 149 onto which the slanted portion of WP 140 is formed. In FIG. 7A, after CMP has formed the generally planar surface of layer 148 and main pole 34, a mask is patterned over the main pole 34, exposing layer 148. The mask may be a suitable photoresist (PR) or alumina. The layer 148 may be nonmagnetic material, such as alumina, or magnetic material, like the soft magnetic material of main pole 34 or WP 140. Then ion milling is performed at the desired angle, as shown by the arrows in FIG. 7A. The ion milling angle is selected to achieve the desired angle that the slanted portion of WP 140 is to make with a normal to the ABS. This removes a portion of layer 148, leaving the slanted surface 149, as shown in FIG. 7B. The WP 140, gap layer 56, side shields 53, 55 and TS 150 are then formed substantially in the manner as described above and shown in FIGS. 2A-5B. Because the subsequent deposition of the layers making up the WP 140, gap layer 56 and TS 150 will generally conform to the shape of the slanted surface 149, the result is that face 171 of TS 150 will also be slanted and generally parallel to the slanted portion of WP 140, as illustrated in FIG. 6A.

Figure 8:
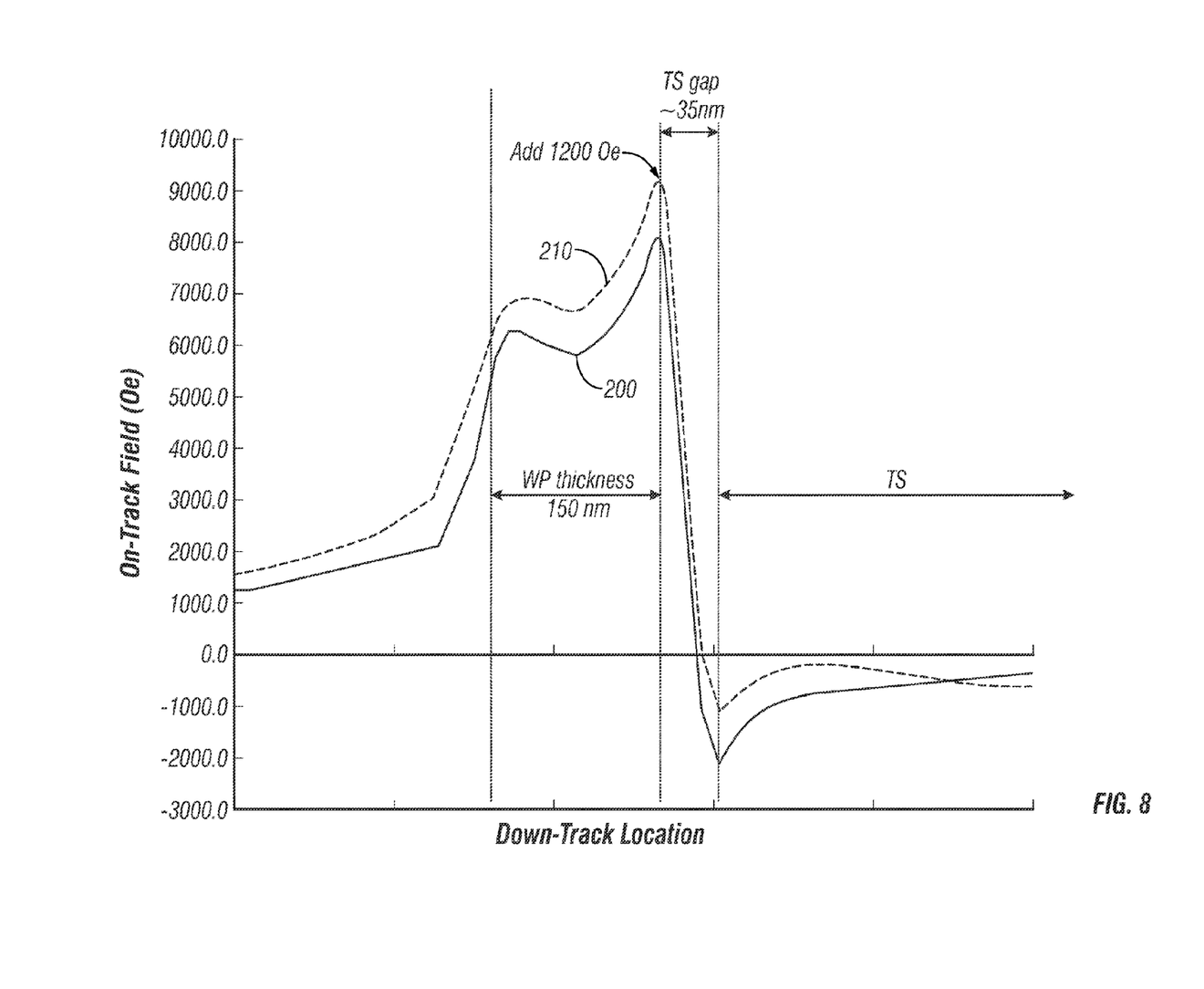
FIG. 8 is a graph of the magnetic field along the track for a write head with a conventional write pole (curve 200) and for a write head with a slanted write pole according to the this invention (curve 210).

The write head with the slanted write pole according to the present invention results in a substantially increased write field. This is illustrated in FIG. 8, which is a measure of the magnetic field along the track for a write head with a conventional write pole (curve 200) and for a write head with a slanted write pole according to the present invention (curve 210). The peak field, which occurs approximately at the edge of the write pole tip 142 adjacent the gap layer 56 (FIG. 6A), is increased by about 1200 Oe for a slanted write pole at an angle of about 10 degrees from a normal to the ABS. Because the slanted write pole increases the peak write field, the gap layer 56 can be made thinner, which results in a better write field gradient. For example, the 1200 Oe write field enables the gap layer 56 to be about 10 nm thinner, which improves the write field gradient by about 10%.

Figure 9A:
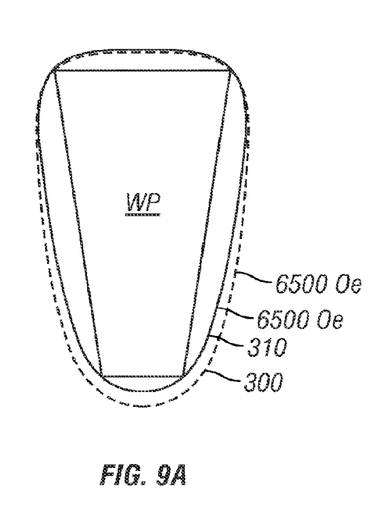
FIG. 9A is an illustration of the write field contour for a conventional write head (curve 300) and for a write head with a slanted write pole slanted at 10 degrees from a normal to the ABS (curve 310).
Figure 9B:
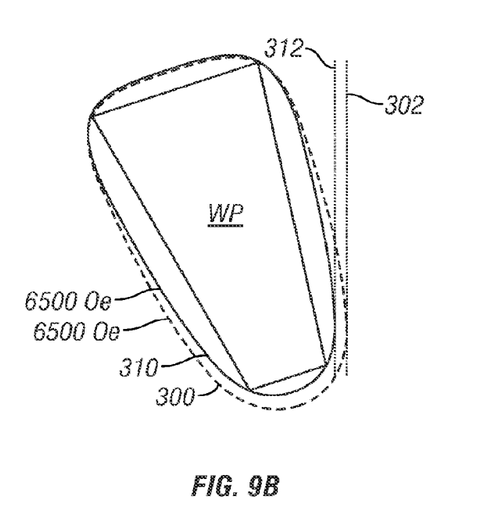
FIG. 9B is an illustration of the write field contours of FIG. 9A but with the write head at a maximum skew angle relative to a data track.

An additional advantage of the present invention is a smaller magnetic core width (MCW), which is the written width on the medium. A smaller MCW reduces the likelihood of erasure on adjacent tracks, especially when writing at a large skew angle relative to a data track, i.e., when the write head is located close to the disk inside diameter or outside diameter. FIG. 9A shows the write field contour for a conventional write head (curve 300) and for a write head with a slanted write pole slanted at 10 degrees from a normal to the ABS (curve 310). FIG. 9B shows the same contours but with the write head at a maximum skew angle relative to a data track. Vertical line 312 corresponds to the outer width of the write field contour for the slanted write pole and shows a narrower write width than vertical line 302 that corresponds to the outer width of the write field for a conventional write pole. The improvement is about a 5% reduction in MCW.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive perpendicular recording write head for magnetizing regions in data tracks of a magnetic recording layer on the disk, the head being formed on a slider having an air-bearing surface (ABS) for facing the recording layer and comprising:
   a main pole having a generally planar surface oriented generally perpendicular to the ABS and an end recessed from the ABS;
   a write pole on the generally planar surface of the main pole and having an end substantially at the ABS, the portion of the write pole extending from it's end at the ABS to the main pole's recessed end being slanted at an angle between about 5 and 20 degrees from a normal to the ABS;
   a support layer of magnetic material for the slanted write pole portion, the support layer being located between the ABS and the main pole's recessed end and having a slanted surface at an angle between about 5 and 20 degrees from a normal to the ABS;
   an electrically conductive coil wrapped around the main pole for generating magnetic flux in the main pole and its connected write pole;
   a trailing shield of magnetically permeable material and having an end substantially at the ABS and spaced from the write pole end in the along-the-track direction, the trailing shield having a slanted face generally parallel to said slanted write pole portion; and
   nonmagnetic gap material between the trailing shield's slanted face and the slanted write pole portion.

2. The write head of claim 1 further comprising a trailing return pole spaced from the write pole in the along-the-track direction.

3. The write head of claim 2 wherein the trailing shield is connected to the trailing return pole.

4. The write head of claim 1 further comprising a pair of side shields of magnetically permeable material and having ends generally coplanar with the write pole end and spaced on opposite sides from the write pole end in the cross-track direction.

5. The write head of claim 4 wherein the sides shields are connected to the trailing shield to form a wraparound shield (WAS).

6. The write head of claim 1 further comprising a leading shield of magnetically permeable material and having an end generally coplanar with the write pole end and spaced from the write pole end in the along-the-track direction, the leading shield being located on the opposite side of the write pole end from the trailing shield in the along-the-track direction.

7. The write head of claim 6 further comprising a leading return pole located on the opposite side of the write pole from the trailing shield in the along-the-track direction.

8. The write head of claim 7 wherein the leading shield is connected to the leading return role.

9. The write head of claim 1 wherein the write pole is formed of magnetic material having a magnetic flux density greater than the magnetic flux density of the material of the support layer.

10. A magnetic recording disk drive perpendicular recording write head for magnetizing regions in data tracks of a magnetic recording layer on the disk, the head being formed on a slider having an air-bearing surface (ABS) for facing the recording layer and comprising:
   a ferromagnetic main pole having an end recessed from the ABS;
   a support layer of ferromagnetic material between the ABS and the main pole's recessed end and having a slanted surface at an angle between about 5 and 20 degrees from a normal to the ABS;
   a ferromagnetic write pole on the main pole and the slanted surface of the support layer and having an end substantially at the ABS, the write pole having a magnetic flux density greater than the magnetic flux density of the main pole and greater than the magnetic flux density of the support layer;
   a trailing shield of magnetically permeable material and having an end substantially at the ABS and spaced from the write pole end in the along-the-track direction; and nonmagnetic gap material between the trailing shield and the write pole.

11. The write head of claim 10 wherein the portion of the write pole on said slanted surface is slanted at an angle between about 5 and 20 degrees from a normal to the ABS and wherein the trailing shield has a slanted face generally parallel to said slanted write pole portion.

12. The write head of claim 10 further comprising a trailing return pole spaced from the write pole in the along-the-track direction.

13. The write head of claim 12 wherein the trailing shield is connected to the trailing return pole.

14. The write head of claim 10 further comprising a pair of side shields of magnetically permeable material and having ends generally coplanar with the write pole end and spaced on opposite sides from the write pole end in the cross-track direction, the side shields being connected to the trailing shield to form a wraparound shield (WAS).

* * * * *